US008621102B2

(12) United States Patent
Karaoguz et al.

(10) Patent No.: US 8,621,102 B2
(45) Date of Patent: Dec. 31, 2013

(54) AUTOMATED ROUTING OF MEDIA THROUGH A MEDIA EXCHANGE NETWORK

(75) Inventors: Jeyhan Karaoguz, Irvine, CA (US); James Bennett, Laguna Beach, CA (US)

(73) Assignee: Broadcom Corporation, Irvine, CA (US)

(*) Notice: Subject to any disclaimer, the term of this patent is extended or adjusted under 35 U.S.C. 154(b) by 2302 days.

(21) Appl. No.: 10/675,843

(22) Filed: Sep. 30, 2003

(65) Prior Publication Data
US 2004/0133694 A1 Jul. 8, 2004

Related U.S. Application Data

(60) Provisional application No. 60/432,472, filed on Dec. 11, 2002, provisional application No. 60/443,894, filed on Jan. 30, 2003, provisional application No. 60/457,179, filed on Mar. 25, 2003, provisional application No. 60/464,711, filed on Apr. 23, 2003.

(51) Int. Cl.
*G06F 15/173* (2006.01)
(52) U.S. Cl.
USPC ............................ 709/238; 709/239; 709/240
(58) Field of Classification Search
USPC .......................................................... 709/238
See application file for complete search history.

(56) References Cited

U.S. PATENT DOCUMENTS

| 6,774,926 B1 | 8/2004 | Ellis et al. |
| 7,325,248 B2 * | 1/2008 | Syvanne .......................... 726/11 |
| 2002/0016971 A1 | 2/2002 | Berezowski et al. |
| 2002/0124258 A1 * | 9/2002 | Fritsch ............................ 725/88 |
| 2003/0135553 A1 * | 7/2003 | Pendakur ....................... 709/205 |
| 2004/0003051 A1 * | 1/2004 | Krzyzanowski et al. ...... 709/217 |
| 2004/0024886 A1 * | 2/2004 | Saxena ............................ 709/229 |
| 2005/0028208 A1 | 2/2005 | Ellis et al. |

FOREIGN PATENT DOCUMENTS

| WO | 0219701 A1 | 3/2002 |
| WO | 0237943 A2 | 5/2002 |
| WO | 02080552 A2 | 10/2002 |

OTHER PUBLICATIONS

European Office Action: EP 04007247 dated Feb. 3, 2012 (5 pages).

* cited by examiner

*Primary Examiner* — Umar Cheema
(74) *Attorney, Agent, or Firm* — Garlick & Markison

(57) ABSTRACT

Aspects of the invention provide a method and system for communication of information in a distributed media network. The communication of information in a distributed media network may include automatically transferring one or more of media, data and service to a view of a first media processing system and/or a first personal computer within the distributed media network. The transferred media, data and/or service may be subsequently routed from the view of the first media processing system and/or the first personal computer to a view of a second media processing system and/or a second personal computer. The routed media, data and/or service may be consumed by the second media processing system and/or the second personal computer. A consumption rule, transfer rule and/or routing rule may control consumption, transfer and routing of the media, data and/or service. Transfer and/or routing of the media, data and/or service may be scheduled.

32 Claims, 12 Drawing Sheets

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO 803 | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO 804 | Overnight Delivery: Avail. Nxt Morning Cost: 5c (Server Stored) | | | Showing All Day (48 Min), Earliest Order Time: 4:00PM MPEG-2 19 Mbps | |

Fig. 8

AUTOMATED ROUTING OF MEDIA THROUGH A MEDIA EXCHANGE NETWORK

CROSS-REFERENCE TO RELATED APPLICATIONS/INCORPORATION BY REFERENCE

This application makes reference to, claims priority to, and claims the benefit of:
U.S. Provisional Application Ser. No. 60/432,472 filed Dec. 11, 2002;
U.S. Provisional Application Ser. No. 60/443,894 filed Jan. 30, 2003;
U.S. Provisional Application Ser. No. 60/457,179 filed Mar. 25, 2003; and
U.S. Provisional Application Ser. No. 60/464,711 filed Apr. 23, 2003.

This application also makes reference to:
U.S. application Ser. No. 10/657,390 filed Sep, 8, 2003; and
U.S. application Ser. No. 10/660,267 filed Sep. 11, 2003.

All of the above stated applications are incorporated herein by reference in their entirety.

FIELD OF THE INVENTION

Certain embodiments of the invention relate to information transfer in a distributed media network. More specifically, certain embodiments of the invention relate to automated routing of media through a media exchange network.

BACKGROUND OF THE INVENTION

A personal computer (PC) is often used to send email messages and attached files over the Internet to other PC's. The attached files may include many types of digitally formatted files such as, text (TXT) files, TIFF files, PDF files, MP3 files, JPEG files, MPEG files, and other similarly formatted file types. Various PC network configurations such as a local area network (LAN), a wide area network (WAN) or an intranet may be utilized to transfer or migrate media and data from one PC to another.

Typically, media and data are transferred from a first PC through at least one server to a second PC at the command or request of a subscriber or a user. Additionally, the data may be transferred from the first personal computer to a plurality of other personal computers. Also, in various PC network configurations, media and data may be migrated directly between one PC and another, between a PC and a server, or between a server and archival storage, for example. As a result, a user is able to command the distribution of media and data in a PC-based environment.

A PC is often used to access media stored on a media peripheral via a wired link. The accessing of media stored on such media peripherals involves the: (1) exchange of media meta information, such as media file names, sizes, dates, resolution and format; (2) uploading of media to the media peripheral; and/or (3) downloading of media from the media peripheral. As a result, a user is able to extract media for tasks such as printing, routing and/or processing. Additionally, extracted media may be loaded, played back and/or reviewed by a user or subscriber. Notwithstanding, the overall process for doing so is a manual process that may require significant user interaction. In certain instances, a user or subscriber, depending on circumstances such as equipment limitations and/or user experience, may be unwilling or unable to perform any of these tasks.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for communication of information in a distributed media network. The method for communication of information in a distributed media network may include automatically transferring one or more of media, data and/or service to a view of a first media processing system and/or a first personal computer within the distributed media network. The transferred media, data and/or service may be subsequently routed from the view of the first media processing system and/or the first personal computer to a view of a second media processing system and/or a second personal computer. The method may further include consuming the routed media, data and/or service by the second media processing system and/or the second personal computer.

In another aspect of the invention, at least a first rule may be utilized to control consumption of the routed media, data and/or service by the second media processing system and/or the second personal computer. The first rule may also be utilized to schedule consumption of the routed media, data and/or service by the second media processing system and/or the second personal computer. In this regard, the first rule may be referred to as a consumption rule. Another aspect of the invention may include controlling the automatic transfer of the routed media, data and/or service by utilizing at least a second rule. Although the second rule may be predefined, it may be modified during operation. Additionally, the second rule may be regarded as a transfer rule. The automatic routing of the media, data and/or service may be controlled using at least a third rule. The third rule may also be predefined and it may be modified or otherwise changed during operation. In this regard, the third rule may he referred to as a routing rule.

Another embodiment of the invention may provide a machine-readable storage, having stored thereon, a computer program having at least one code section for providing communication of information in a distributed media network according to the steps as described above.

Aspects of the invention may also include a system for communicating information in a distributed media network. The system may include at least one processor that may be utilized to automatically transfer media, data and/or service to a view of a first media processing system and/or a first personal computer within the distributed media network. The at least one processor may automatically route or otherwise control routing of the transferred media, data and/or service from the view of the first media processing system and/or the first personal computer to a view of a second media processing system and/or a second personal computer. The processor may consume and/or control the consumption of the routed media, data and/or service by the second media processing system and/or the second personal computer.

At least a first rule may be utilized by the processor to control consumption of the media, data and/or service by the second media processing system and/or the second personal computer. In this regard, the first rule may be referred to as a consumption rule. Notwithstanding, the processor may utilize the first rule, for example, to schedule the consumption of the media, data and/or service by the second media processing system and/or the second personal computer.

Additionally, the processor may control the automatic transfer of the media, data and/or service by utilizing at least a second rule. The second rule may be pre-defined and utilized by the processor to control automatic transfer of the media, data and/or service. In this regard, the second rule may be referred to as a transfer rule. In a somewhat similar manner, the processor may control automatic routing by utilizing at least a third rule. The processor may be utilized to define, modify and/or otherwise facilitate definition of the third rule. The third rule may be regarded as a routing rule. The at least one processor may be computer processor, media peripheral processor, a media exchange system processor, media processing system processor, a storage processor or a combination thereof.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a media guide user interface showing several options of a pushed media in accordance with an embodiment of the present invention.

DETAILED DESCRIPTION OF THE INVENTION

Aspects of the invention provide a method and system for communication of information in a distributed media network. The communication of information in a distributed media network may include automatically transferring one or more of media, data and/or service to a view of a first media processing system and/or a first personal computer within the distributed media network. The transferred media, data and/or service may be subsequently routed from the view of the first media processing system and/or the first personal computer to a view of a second media processing system and/or a second personal computer. The routed media, data and/or service may be consumed by the second media processing system and/or the second personal computer.

At least a first rule such as a consumption rule, may be utilized to control consumption of the routed media, data and/or service by the second media processing system and/or the second personal computer. The first rule may also be utilized to schedule consumption of the routed media, data and/or service by the second media processing system and/or the second personal computer. Automatic transfer of the routed media, data and/or service may be controlled by utilizing at least a second rule such as a transfer rule. The second rule may be predefined and/or modified during operation. The automatic routing of the media, data and/or service may also be controlled using at least a third rule such as a routing rule. The third rule or routing rule may also be predefined, and may be modified or otherwise changed during operation.

Figure 1:
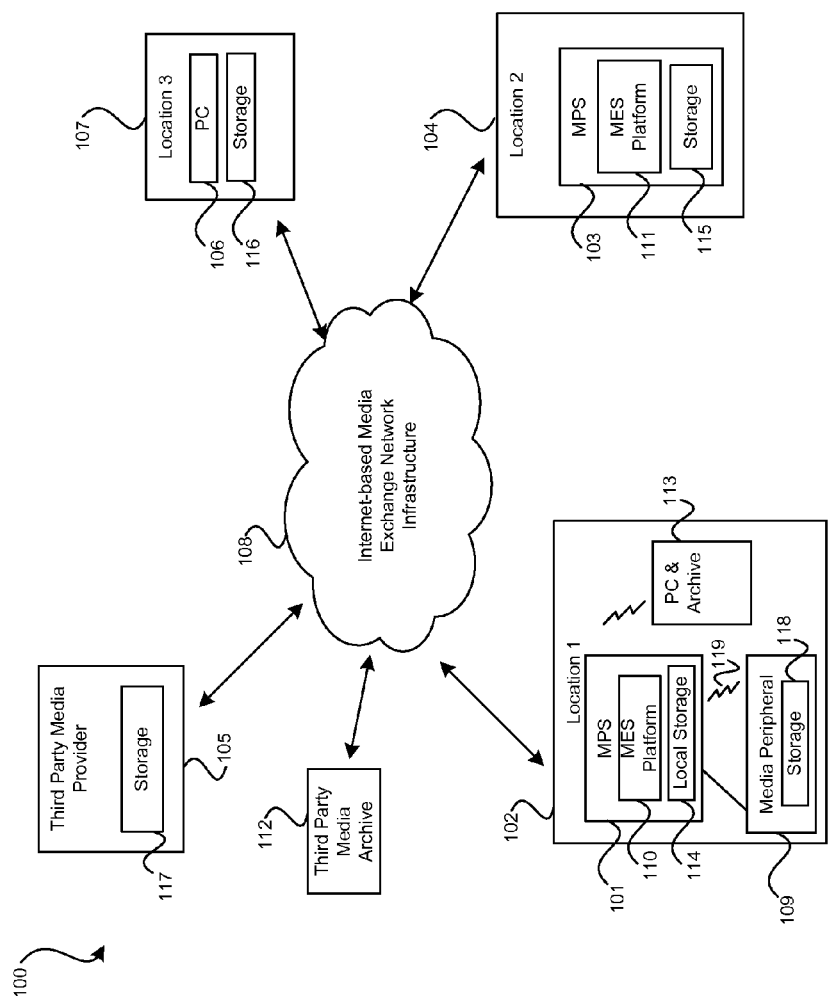
FIG. 1 is a diagram illustrating an embodiment of an exemplary media exchange network supporting the automated routing and consumption of media, data, and/or services, in accordance with various aspects of the present invention.

FIG. 1 is a diagram illustrating an embodiment of an exemplary media exchange network 100 supporting the migration of media, data, and/or services in accordance with various aspects of the invention. Specifically, a media exchange network 100 may be a communication network, which may include a first media processing system (MPS) 101 situated at a first location 102 of the media exchange network 100 and a second media processing system 103 situated at a second location 104. The media exchange network 100 may also include a third ($3^{rd}$) party media provider 105, a PC 106 situated at a third location 107, and an Internet-based media exchange network infrastructure 108. Also included is a third ($3^{rd}$) party media archive 112 and a third ($3^{rd}$) party media provider 105. For illustrative purposes, the first location may be a user's or subscriber's home, the second location may be a family members home and the third location may be a friend's home. Notwithstanding, any one or more of the first, second and/or third locations may be a business or office location.

A media processing system may also comprise a set-top-box (STB), a PC, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the media processing system or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

The home media processing system 101, the family's media processing system 103, the PC 106 and the third ($3^{rd}$) party media provider 105 may each connect to the Internet-based media exchange network infrastructure 108 to allow communication or media migration between the various components 101, 103, 105, 112 and 106. The first location 102 such as the user's or subscriber's home 102, may also include a media peripheral 109 and a home PC and archive 113. The media peripheral 109 and the home PC and archive 113 may interface with the home media processing system 101 via a wired or wireless connection, for example. When interfacing to the home media processing system 101, the media peripheral 109 and the home PC and archive 113 may be considered part of the media exchange network 100. A personal computer (PC) comprising media exchange software (MES) running on or being executed by the personal computer, may also be referred to as a media processing system.

The MPS 101 may include a media exchange software (MES) platform 110 and the MPS 103 may include a similar MES platform 111. In general, a media exchange software platform, such as the media exchange software platform 111, may provide certain functionality within an MPS such as the ability to cause the migration of media, data, and/or services on a media exchange network. Additionally, a media exchange software platform may provide the capability for a user or subscriber to construct a user profile and register their media processing system on the media exchange network. The media exchange software platform 111 may also provide various views to a user of a media processing system that may be displayed on a TV screen or monitor of the MPS 101, for example. In accordance with an aspect of the invention, the views may include a device view, a media view, and/or a channel view, for example.

In accordance with an embodiment of the invention, the various components of the media exchange network may be adapted to or have the capability to store digital media and/or data. The media processing system 101 may include a local storage 114 and the MPS 103 in the second location, such as the family member's home 104 may also include storage 115. The third location, such as the friend's home 107 may include storage 116 and the third ($3^{rd}$) party media provider 105 may also include a storage 117. The third ($3^{rd}$) party media archive 112 may be a storage device located within and/or coupled to the media exchange network 100. The media peripheral 109 may also have its own storage, which may be a limited storage area 118, for example.

For illustrative purposes, the third ($3^{rd}$) party media provider 105 may include, a server storing movies in a digital video format in the storage area 117. The media peripheral 109 may include a digital camera that may generate and store pictures in a digital image format in the storage area 118. The PC 106 may store music, such as MP3, WMA or WAV formatted files in the storage area 116 at the third location 107. The MPS 103 at the second location 104 may store family photos in a digital image format in storage area 115. The third ($3^{rd}$) party media archive 112 may store a backup of at least some of the media and/or data currently stored in the local storage area 114 on the MPS 101 at the first location.

The storage areas 114 and 115 of MPS's 101 and 103 respectively, may include a main storage and/or removable storage, for example. The main storage may include, for example, hard disk drives, a DVD player, a CD player, floppy disk drives, RAM, or any combination thereof. The removable storage may include, for example, memory sticks, PCMCIA cards, compact flash cards, secure digital (SD) cards, multimedia cards, microdrives, or any combination of these. The PC's 106 and 113 may include a desktop PC, a notebook PC, a handheld computer, a PDA, a PC tablet or any computing device. Additionally, the home PC 113 may also include substantial archiving capability. However, the invention is not so limited.

The media peripheral 109 may include, for example, a digital camera, a digital camcorder, a MP3 or WMA player, a home and/or portable juke-box system, a PDA, a handheld computer, a PC tablet and a multi-media gateway device, for example. The MPS's 101, 103 may each include a TV screen or monitor for viewing a device view, a media view, a channel view, and various sub menus of each, in accordance with various embodiments of the present invention. The views may be provided by the media exchange server (MES) platforms 110 and 111 respectively.

The Internet-based media exchange network infrastructure 108 may include, for example, cable infrastructure, satellite network infrastructure, xDSL infrastructure, Internet infrastructure, and intranet infrastructure and/or other access technology providing wide area network (WAN) connectivity and capabilities.

Figure 2:
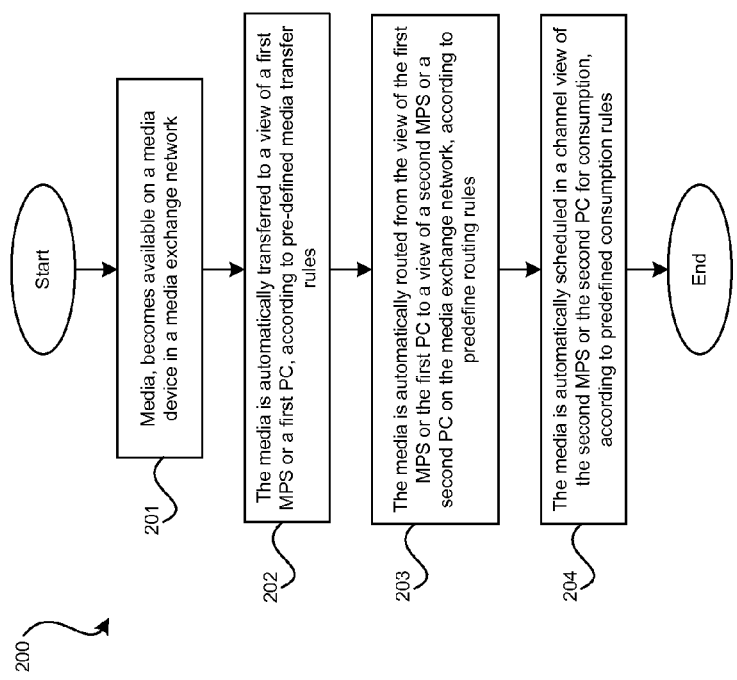
FIG. 2 is a flowchart illustrating an embodiment of an exemplary method that may be utilized to perform automated routing and consumption of media, data, and/or services through the media exchange network of FIG. 1, in accordance with various aspects of the invention.

FIG. 2 is a flowchart illustrating an embodiment of an exemplary method 200 that may be utilized to perform automated routing and consumption of media, data, and/or services through the media exchange network 100 of FIG. 1, in accordance with various aspects of the invention. In the description of the method 200 hereafter, the term media includes any one or more of media, data, and services.

Referring to FIG. 2, in step 201, media may become available on a device in a media exchange network. The device may be media processing system, a PC, or a media peripheral, for example. In step 202, the media may be automatically transferred into a view of a first media processing system and/or a first PC on the media exchange network, according to pre-defined media transfer rules. The view may be a device view, a media view and/or a channel view and may be provided by a TV or a monitor. In step 203, the media may be automatically routed from the view of the first media processing system or the first PC to a view of a second media processing system or a second PC on the media exchange network, according to pre-defined routing rules. In step 204, the media may be automatically scheduled into a channel view of the second media processing system and/or the second PC for consumption, according to pre-defined consumption rules.

The device view, the media view, and/or the channel view may be provided by the media exchange server platform in the home media processing system 101 and may be viewed on a TV screen or a monitor of the media processing system 101 at the first location. In accordance with an embodiment of the invention, the device view may include a table of devices on the media exchange network, media content categories, and/or specific media content. The media view may include a table of media content categories and specific media content such as individual songs, video clips, and images, for example. In accordance with an embodiment of the invention, the channel view may include a table of channels such as personal media channels, friends' and family channels, and third ($3^{rd}$) party media channels each having media program content that may be scheduled.

Media, data, and/or services may be routed through a media exchange network and scheduled for consumption, according to the method 200, in a fully automatic manner with no user intervention, based on pre-defined rules. Modifications of the method 200 may be implemented as well, in accordance with various embodiments of the present invention, as exemplified in some of the examples described below.

The pre-defined rules may include rules that may be utilized to automatically transfer media from a media peripheral to an media processing system and/or PC, rules for automatically routing media from first MPS and/or first PC to at least a second media processing system and/or second PC. The pre-defined rules may also include rules for automatically scheduling media for consumption in a channel view. In accordance with an embodiment of the invention, the pre-defined rules may be defined by a user and encapsulated in a meta file that may be hosted on a user's media processing system and/or PC. The pre-defined rules may take into account various aspects of operating on the media exchange network including authorization, registration, billing, cost, size of files and other similar operating criteria. Additionally, the pre-defined rules may be overridden by user intervention, in accordance with various aspects of the present invention. Accordingly, the rules may be dynamically defined or altered and new rules may also be generated during operation or on the fly. The meta file may also contain pre-defined scheduled viewing or presentation times, for example.

As an example, referring to FIG. 1, a user of the media peripheral 109, for example a digital camera, may have just taken some pictures while out for a walk in the woods. Upon arriving at their home 102, the digital pictures in the media peripheral 109 may be automatically transferred to a media view in the media processing system 101 via, for example, a wireless link. The updated media view may be automatically routed to the MPS 103 at the family member's home 104, for example Mom's home, via the Internet-based media exchange network infrastructure 108. Next, the digital pictures may be automatically scheduled into a channel of the channel view of the media processing system 103 from the media view.

In the previous example, the user of the media peripheral 109 and media processing system 101 may have set up a pre-defined rule that may have been tailored to initiate the automatic transfer of the newly taken digital pictures as soon as the media peripheral 109 is in proximity to the media processing system 101. Also, the user of the MPS 101 may have set up a pre-defined rule that may have been tailored to initiate the automatic routing of the digital pictures to the media processing system 103 over the media exchange network 100. The user of the MPS 103 may also have set up a pre-defined rule that may have been tailored to initiate automatic scheduling of newly received media to the channel view of the MPS 103.

In another example, the third ($3^{rd}$) party media provider 105 may update the information on a portfolio of stocks owned by the user of the media processing system 101. In this regard, the third ($3^{rd}$) party media provider 105 may automatically route the updated portfolio information to the MPS 101 at the first location or user's home 102. The updated portfolio information may be initially stored in the local storage area 114. At 6:00 p.m., for example, any new media that may have entered the local storage area 114, including the updated portfolio information, may be automatically scheduled in a channel view of the MPS 101. Also, the updated portfolio information may be automatically routed to the friend's PC 106 at the friend's home 107 and scheduled into a channel view of the PC 106. In such a scenario, the PC 106 may include an MES platform to provide, at least, a channel view.

In a further example, the third ($3^{rd}$) party media provider 105 may also be a manufacturer, distributor, or has some association with personal digital assistants (PDA's). The media peripheral 109 may include a PDA. In an aspect of the invention, an update to the operating system of the PDA 109 may become available from the third ($3^{rd}$) party media provider 105. The operating system update may be automatically routed from the third ($3^{rd}$) party media provider 105 to the MPS 101 at the first location or user's home 102 via the media exchange network 100 and stored in the local storage area 114. As soon as the PDA 109 is in proximity to the MPS 101, the operating system update is automatically downloaded, via a wireless connection, to the PDA 109.

As yet another example, a user of the PC 106 at the friend's home 107 may load several new MP3 music files, for example, into the storage area 116. The newly loaded MP3 files may be automatically routed to the media processing system 103 at the second location or family member's home 104 via the media exchange network 100 and stored in the storage area 115. At 7:00 p.m. on Sunday evening, for example, the MP3 files may be automatically scheduled into the channel view of the media processing system 103 for consumption.

In accordance with an embodiment of the present invention, prompts, banners and/or cues may configured to pop up on a user's TV screen to alert a user to new media that has been automatically routed to him. If, for example, new media to a user has not been consumed after a certain period of time such as two (2) weeks, the new media may be automatically archived to the third ($3^{rd}$) party media archive 112, for example, in accordance with an embodiment of the present invention.

If new media, automatically routed to a user, comprises a large file or several large files, it may be desirable to allow the new media to be downloaded over a longer period of time such as a few hours or a couple of days. The extended time download could be performed in the background while the user may be using his home media processing system 101, for example, for other purposes. Additionally, the download may occur during off peak traffic periods.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create an MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
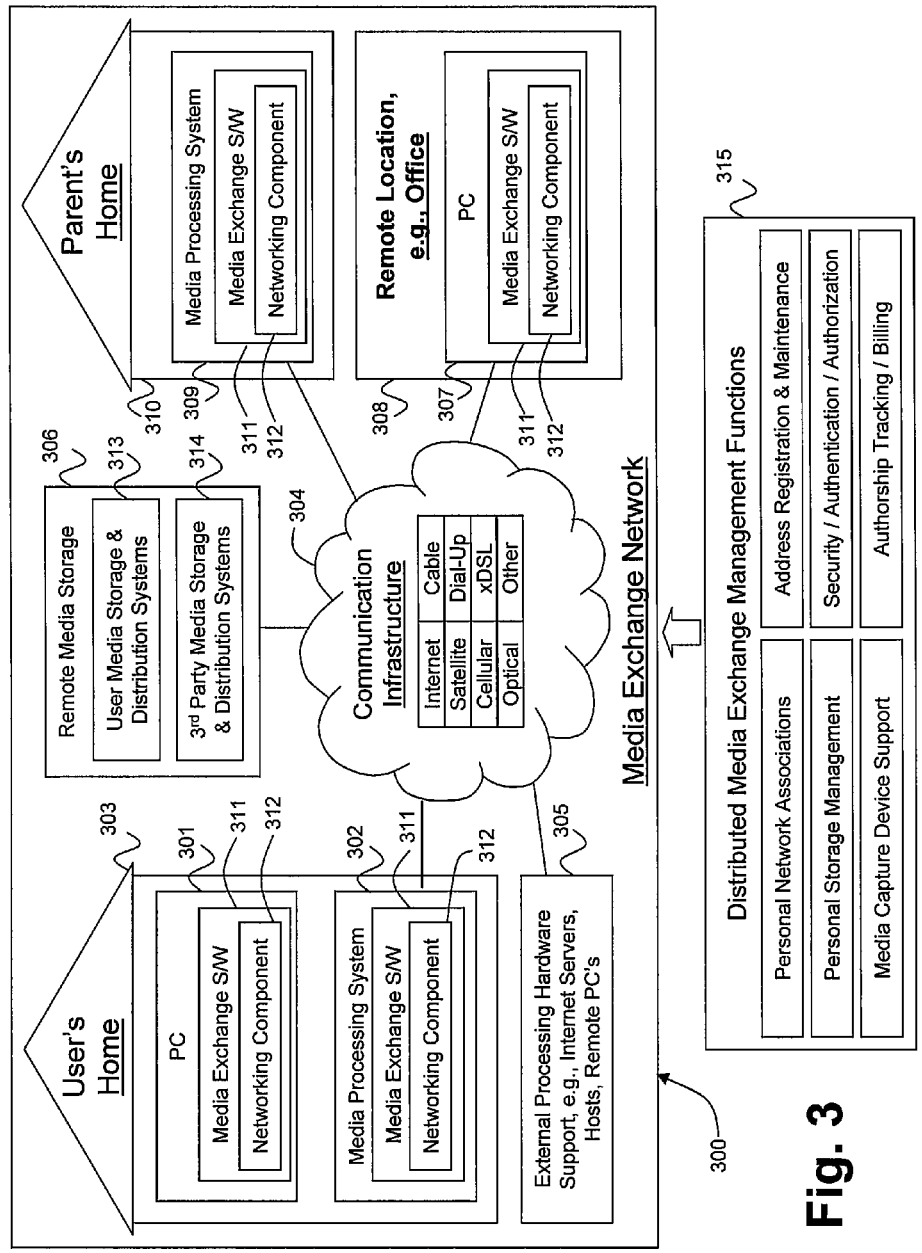
FIGS. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
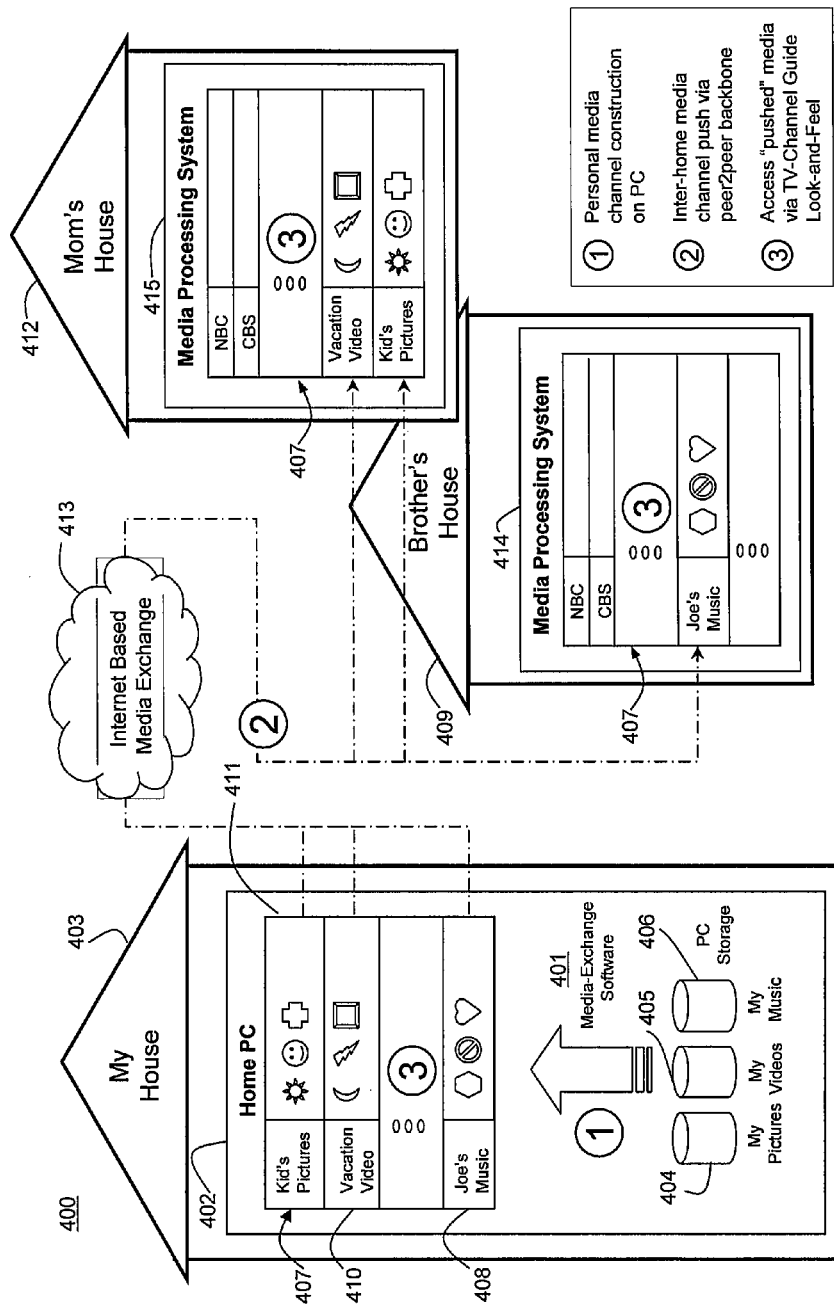
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
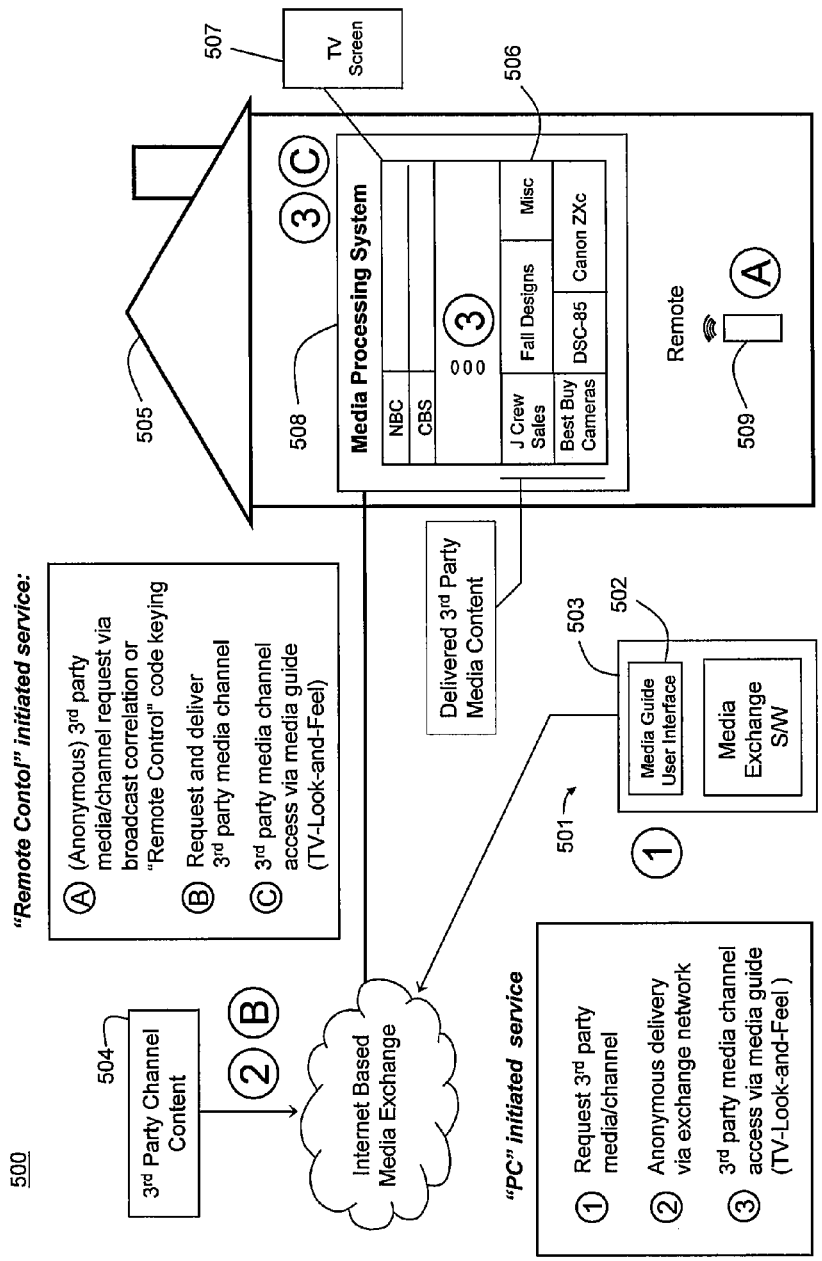
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
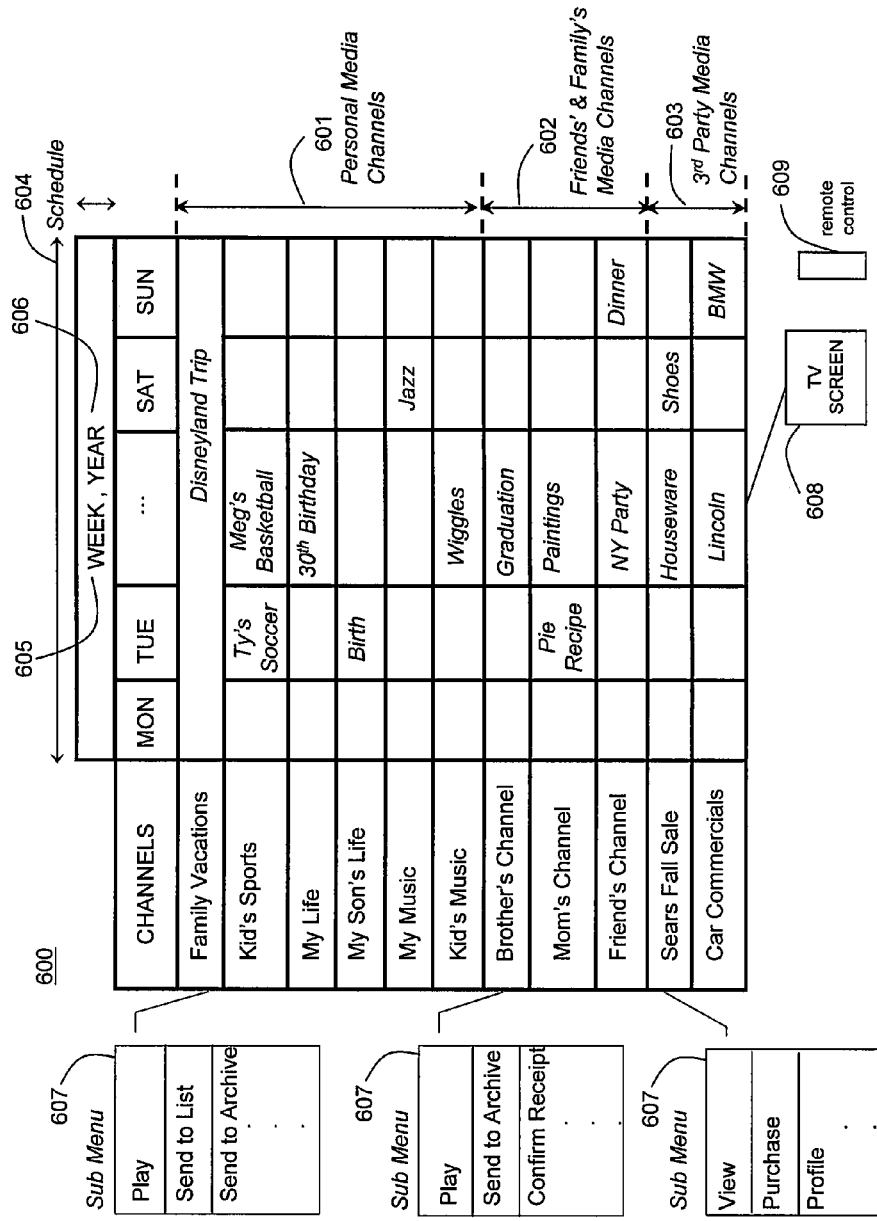
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
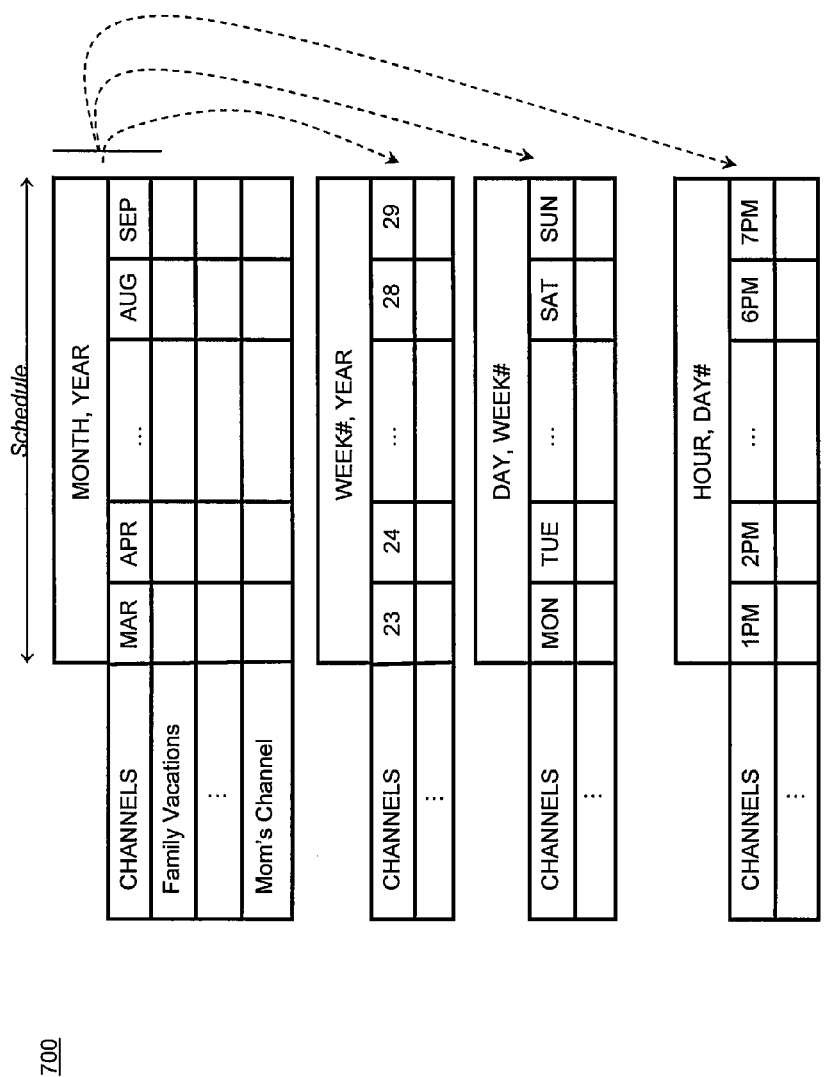
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
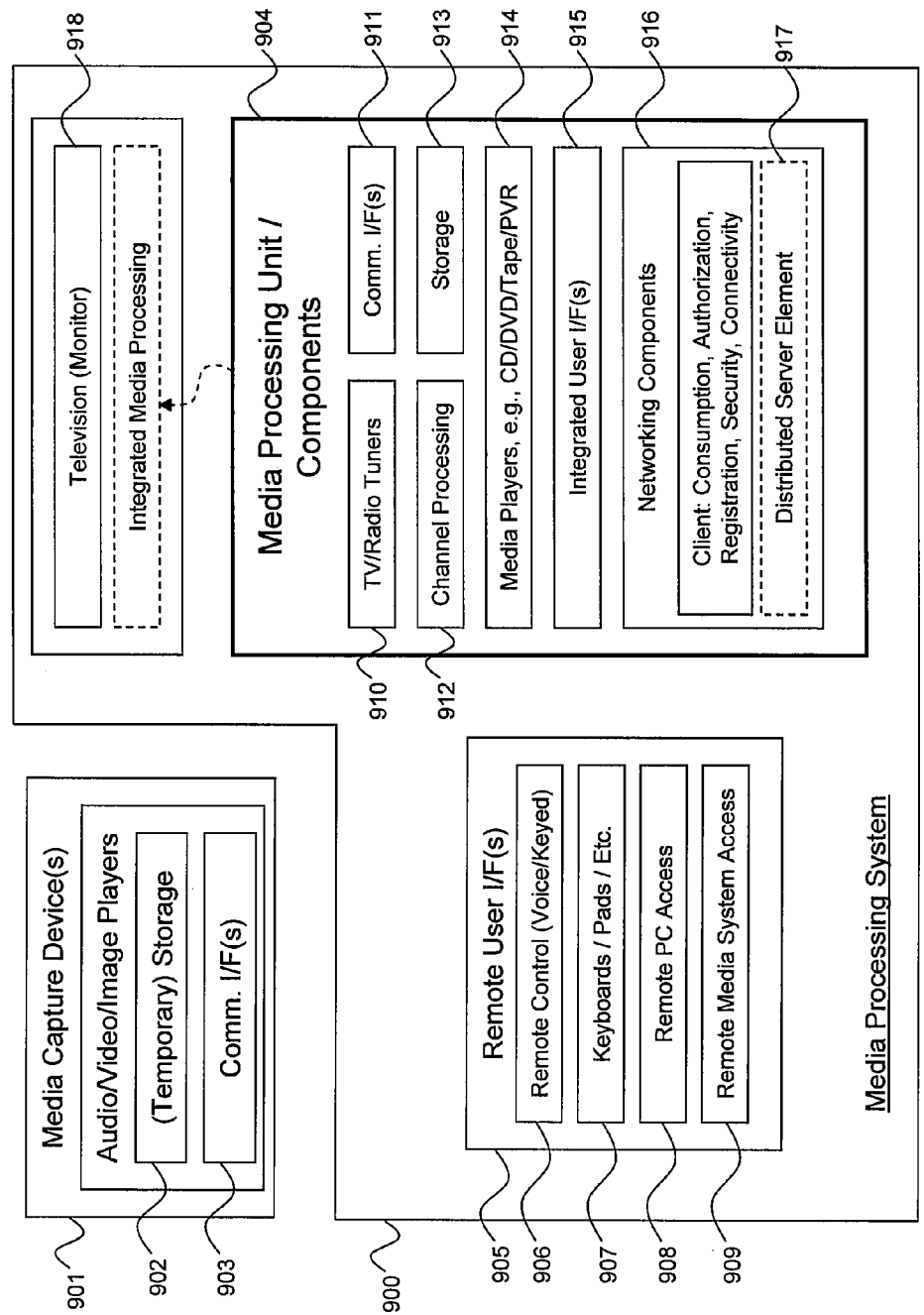
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element-917 that is part of a distributed server.

Figure 9B:
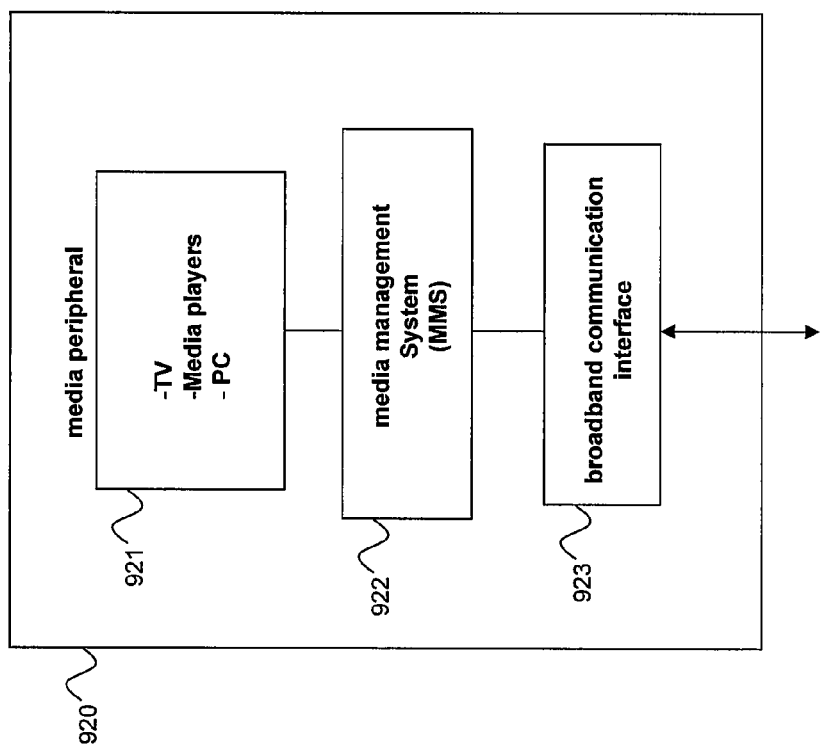
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
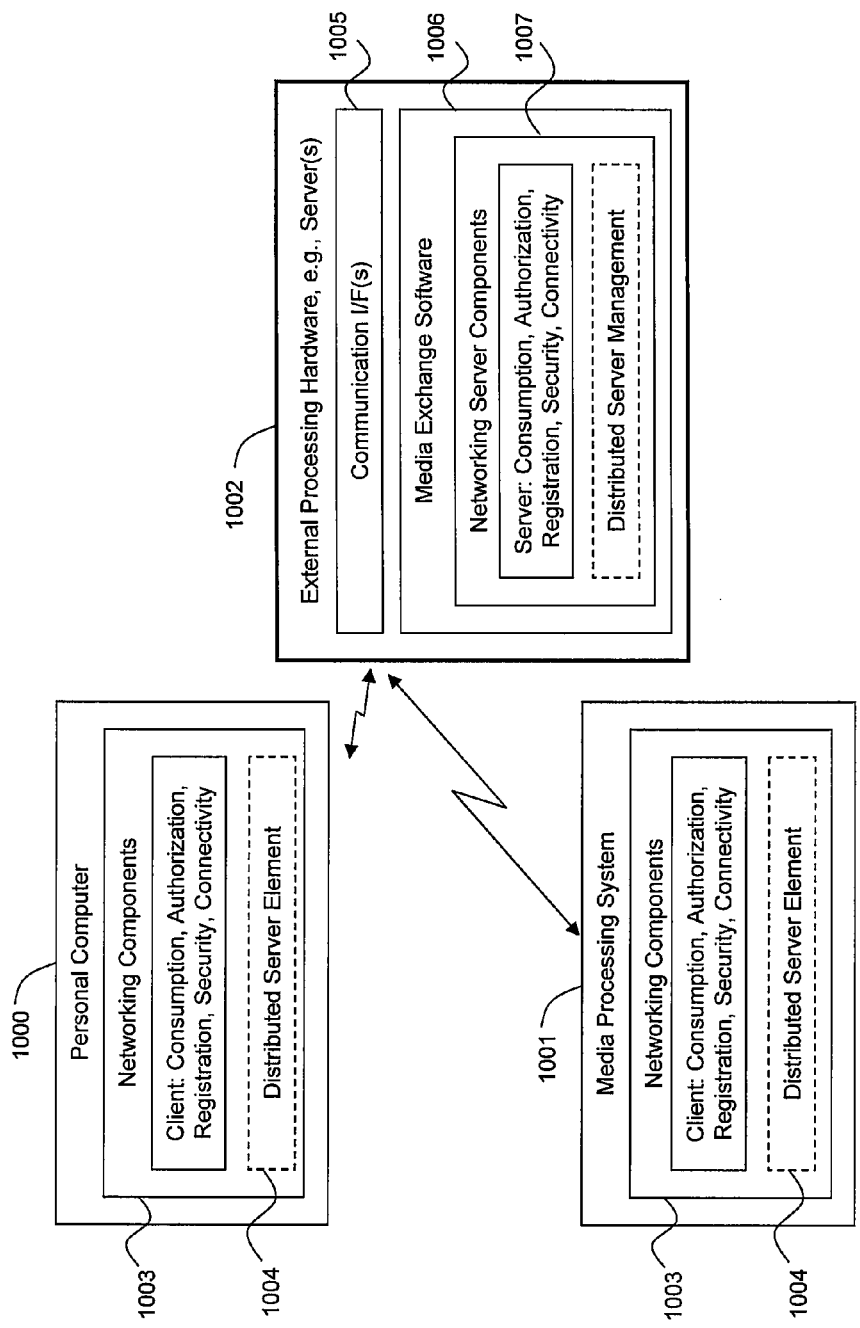
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
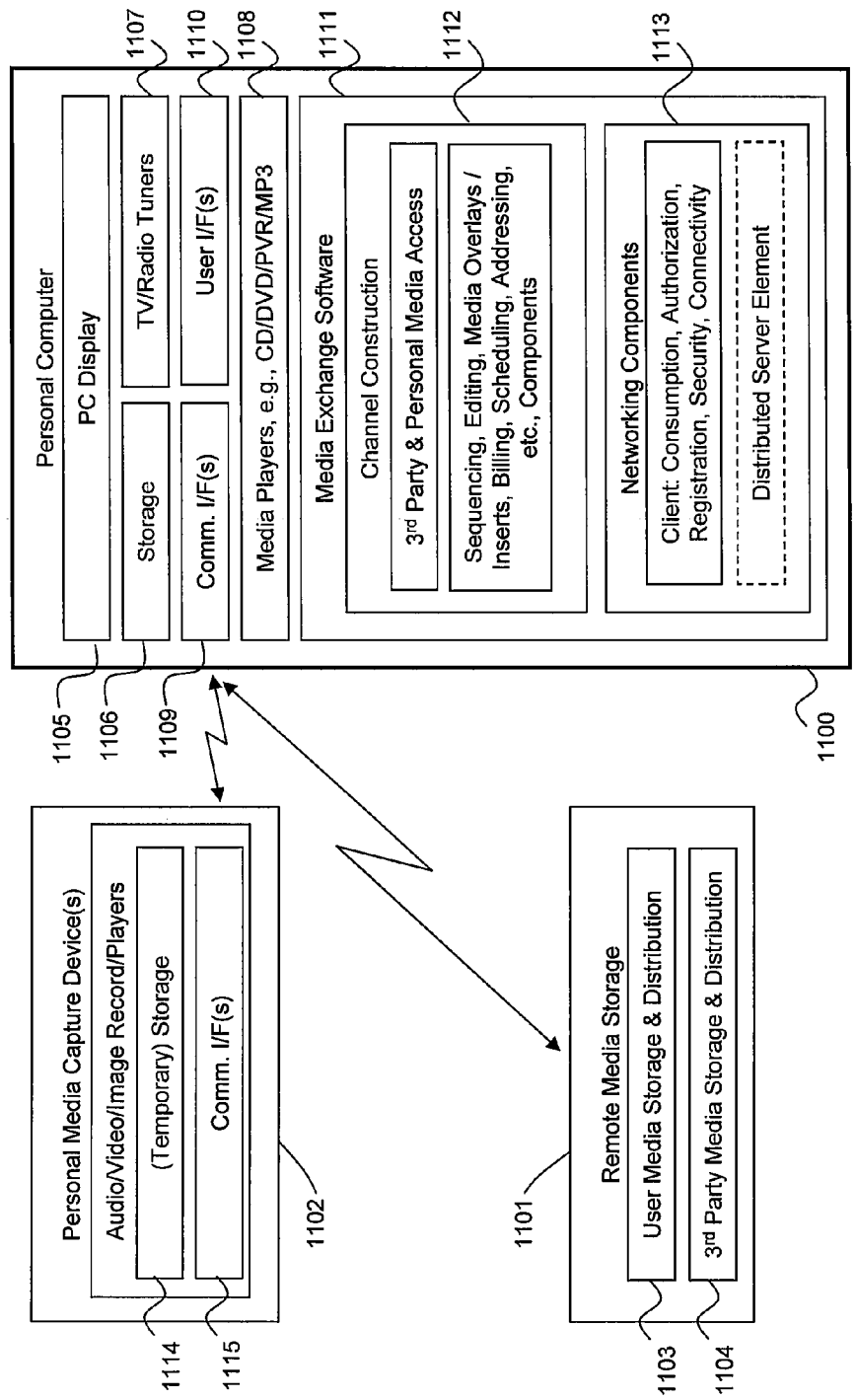
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In summary, aspects of the invention may also include a system for communicating information in a distributed media network. At least one processor may be utilized to automatically transfer media, data and/or service to a view of a first media processing system and/or a first personal computer within the distributed media network. The processor may automatically route the transferred media, data and/or service from the view of the first media processing system and/or the first personal computer to a view of a second media processing system and/or a second personal computer. The processor may consume or control the consumption of the routed media, data and/or service by the second media processing system and/or the second personal computer.

A first rule such as a consumption rule may be utilized by the processor to control consumption of the media, data and/or service by the second media processing system and/or the second personal computer. Notwithstanding, the processor may utilize the first rule, for example, to schedule the consumption of the media, data and/or service by the second media processing system and/or the second personal computer. Additionally, the processor may control the automatic transfer of the media, data and/or service by utilizing at least a second rule. The second rule may be referred to as a transfer rule and may be pre-defined and utilized by the processor to control automatic transfer of the media, data and/or service. The processor may control automatic routing of the media, data and/or services by utilizing at least a third rule. The processor may also be utilized to define, modify and/or otherwise facilitate definition of the third rule. The third rule may be regarded as a routing rule. The at least one processor may be computer processor, media peripheral processor, a media exchange system processor, media processing system processor, a storage processor or a combination thereof.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for automated routing of media through a media exchange network comprising:

determining when media content becomes available for a first media processing device on the media exchange network, wherein the media exchange network is used to exchange shared media among devices on the media exchange network and wherein the first media processing device is one of the plurality of devices on the media exchange network for exchanging shared media;

utilizing a first pre-defined rule associated with the media exchange network to automatically provide availability of the media content in a first view for viewing on a first display associated with the first media processing device;

utilizing a second pre-defined rule associated with the media exchange network to automatically transfer the media content from the first media processing device to a second media processing device for viewing on a second display associated with the second media processing device, wherein the second pre-defined rule identifies the second media processing device for routing the media content and wherein the second media processing device is also one of the plurality of devices on the media exchange network for exchanging shared media; and utilizing a scheduled programming of shared media associated with the media exchange network to automatically schedule the media content for viewing on the second display when the media content is made available for consumption by the second media processing device.

2. The method of claim 1, wherein when utilizing the scheduled programming, the media content for viewing is scheduled within a program channel established for viewing by the second media processing device.

3. The method of claim 2, wherein the first media processing device controls the program channel established for viewing by the second media processing device.

4. The method of claim 2, wherein the first media processing device pushes the media content to the second media processing device as part of the scheduled programming established for the second media processing device.

5. The method of claim 1, wherein when determining when the media content becomes available for the first media processing device on the media exchange network, the media content becomes available on a media peripheral coupled to the media exchange network.

6. The method of claim 1, wherein the first media processing device is a personal computer.

7. The method of claim 1, wherein the first media processing device is a set top box.

8. The method of claim 1, wherein when utilizing the first pre-defined rule, the availability of the media content in the first view for viewing on the first display is displayed in a device view that identifies the plurality of devices coupled to the media exchange network.

9. The method of claim 1, wherein when utilizing the first pre-defined rule, the availability of the media content in the first view for viewing on the first display is displayed in a media view that identifies a plurality of media content categories available for the scheduled programming.

10. The method of claim 1, wherein when utilizing the first pre-defined rule, the availability of the media content in the first view for viewing on the first display is displayed in a media view that identifies a plurality of content available for the scheduled programming.

11. The method of claim 1, wherein the media content is provided by a third party provider via the media exchange network.

12. The method of claim 1, wherein the media content is provided by a third party provider via the media exchange network and the first pre-defined rule associated with the media exchange network determines when the media content is provided in the first view for viewing on the first display.

13. A method for automated routing of media through a media exchange network comprising:
establishing a first rule associated with the media exchange network to provide availability of media content on the media exchange network to a first media processing device coupled to the media exchange network, wherein the media exchange network is used to exchange shared media among devices on the media exchange network and wherein the first media processing device is one of the plurality of devices on the media exchange network for exchanging shared media;
establishing a second rule associated with the media exchange network to provide routing of the media content from the first media processing device to a second media processing device coupled to the media exchange network, wherein the second media processing device is also one of the plurality of devices on the media exchange network for exchanging shared media;
establishing a scheduled programming of shared media for the plurality of devices on the media exchange network;
determining when the media content becomes available on the media exchange network for the first media processing device;
utilizing the first rule to automatically provide the media content in a first view for viewing on a first display associated with the first media processing device;
utilizing the second rule to automatically transfer the media content from the first media processing device to the second media processing device for viewing on a second display associated with the second media processing device; and
utilizing the scheduled programming of shared media to automatically schedule the media content for viewing on the second display when the media content is made available for consumption by the second media processing device.

14. The method of claim 13, wherein when utilizing the scheduled programming, the media content for viewing is scheduled within a program channel established for viewing by the second media processing device.

15. The method of claim 14, wherein the first media processing device controls the program channel established for viewing by the second media processing device.

16. The method of claim 14, wherein the first media processing device pushes the media content to the second media processing device as part of the scheduled programming established for the second media processing device.

17. The method of claim 13, wherein when determining when the media content becomes available for the first media processing on the media exchange network, the media content becomes available on a media peripheral coupled to the media exchange network.

18. The method of claim 13, wherein the first media processing device is a personal computer.

19. The method of claim 13, wherein the first media processing device is a set top box.

20. The method of claim 13, wherein when utilizing the first rule, the availability of the media content in the first view for viewing on the first display is displayed in a device view that identifies the plurality of devices coupled to the media exchange network.

21. The method of claim 13, wherein when utilizing the first rule, the availability of the media content in the first view for viewing on the first display is displayed in a media view that identifies a plurality of media content categories available for the scheduled programming.

22. The method of claim 13, wherein when utilizing the first rule, the availability of the media content in the first view for viewing on the first display is displayed in a media view that identifies a plurality of content available for the scheduled programming.

23. The method of claim 13, wherein the media content is provided by a third party provider via the media exchange network.

24. The method of claim 13, wherein the media content is provided by a third party provider via the media exchange network and the first rule associated with the media exchange network determines when the media content is provided in the first view for viewing on the first display.

25. An apparatus for automated routing of media through a media exchange network comprising:
a media processor to establish a first rule associated with the media exchange network to provide availability of media content for the media processor from a media source coupled to the media exchange network, wherein the media exchange network is used to exchange shared media among devices on the media exchange network and wherein the apparatus is one of the plurality of devices on the media exchange network for exchanging shared media;

the media processor to establish a second rule associated with the media exchange network to provide routing of the media content from the apparatus to a second media processing device coupled to the media exchange network, wherein the second media processing device is also one of the plurality of devices on the media exchange network for exchanging shared media;

the media processor to establish a scheduled programming of shared media for the plurality of devices on the media exchange network;

the media processor to determine when the media content becomes available on the media exchange network for the media processor and in response, to utilize the first rule to automatically provide the media content in a first view for viewing on a first display associated with the apparatus, to utilize the second rule to automatically transfer the media content from the apparatus to the second media processing device for viewing on a second display associated with the second media processing device, and to utilize the scheduled programming of shared media to automatically schedule the media content for viewing on the second display when the media content is made available for consumption by the second media processing device; and storage coupled to the media processor to store the media content.

26. The apparatus of claim 25, wherein the media processor utilizes the scheduled programming to schedule the media content for viewing within a program channel established for viewing by the second media processing device.

27. The apparatus of claim 26, wherein the media processor automatically pushes the media content to the second media processing device as part of the scheduled programming of the program channel for the second media processing device.

28. The apparatus of claim 25, wherein when the media processor utilizes the first rule, the availability of the media content in the first view for viewing on the first display is displayed in a device view that identifies the plurality of devices coupled to the media exchange network.

29. The apparatus of claim 25, wherein when the media processor utilizes the first rule, the availability of the media content in the first view for viewing on the first display is displayed in a media view that identifies a plurality of media content categories available for the scheduled programming.

30. The apparatus of claim 25, wherein when the media processor utilizes the first rule, the availability of the media content in the first view for viewing on the first display is displayed in a media view that identifies a plurality of content available for the scheduled programming.

31. The apparatus of claim 25, wherein the media source is a third party provider.

32. The apparatus of claim 25, wherein the media source is a third party provider and the first rule associated with the media exchange network determines when the media content is provided in the first view for viewing on the first display.

* * * * *